Aug. 27, 1968  J. G. CADIOU  3,398,486
ROOF ASSEMBLIES
Filed Dec. 22, 1966  6 Sheets-Sheet 1
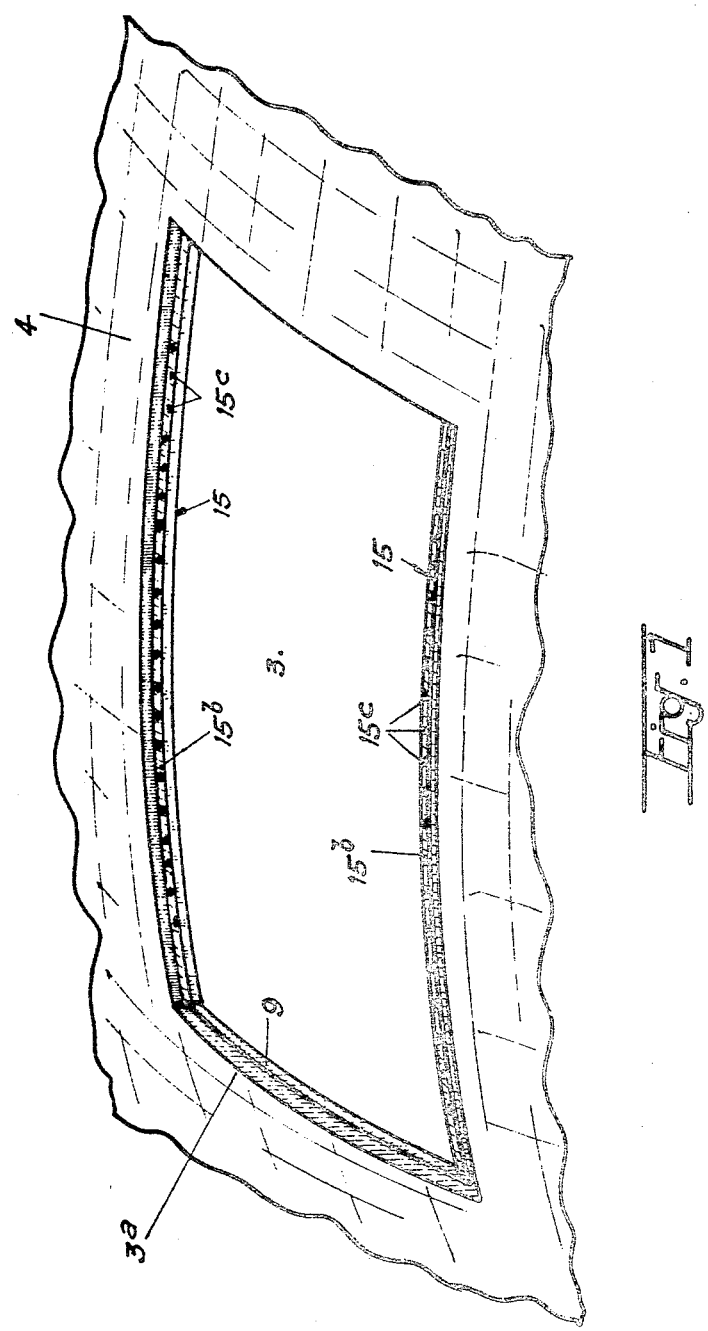

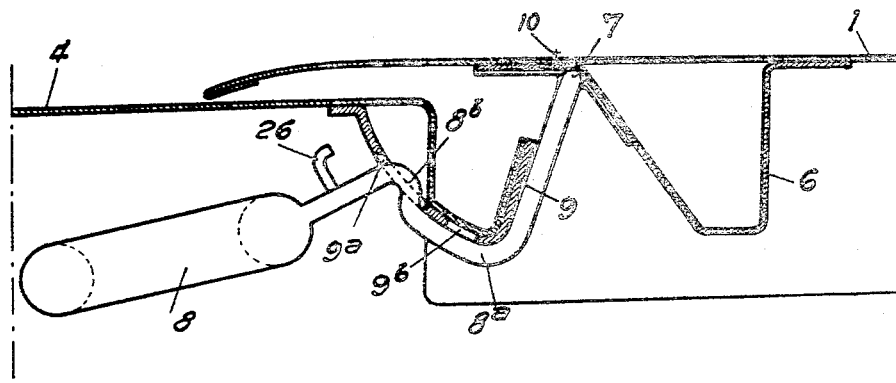
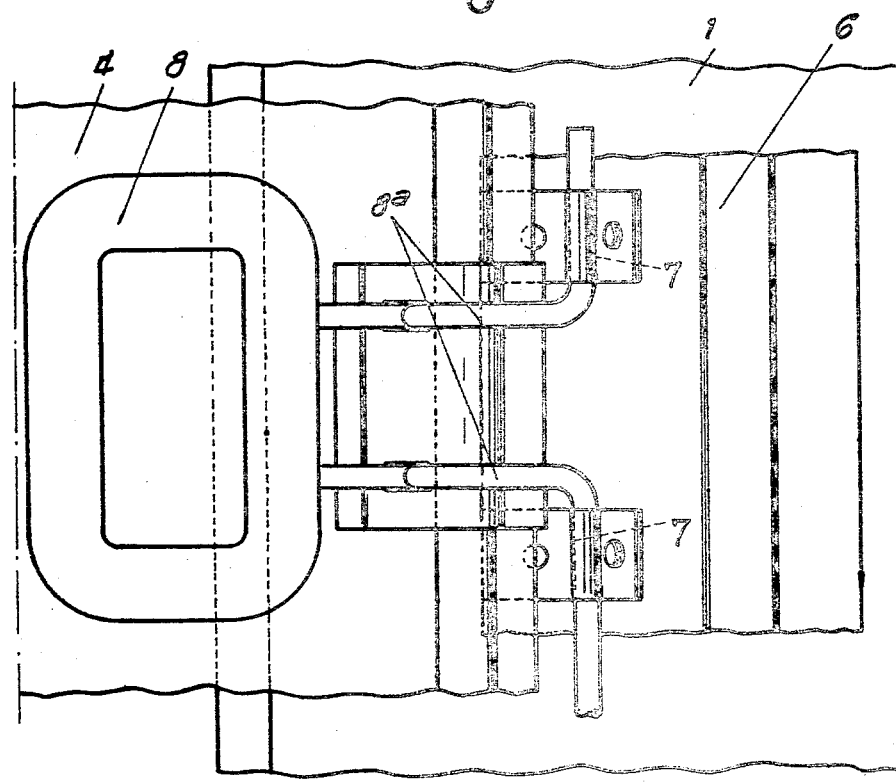

Aug. 27, 1968   J. G. CADIOU   3,398,486
ROOF ASSEMBLIES
Filed Dec. 22, 1966   6 Sheets-Sheet 3
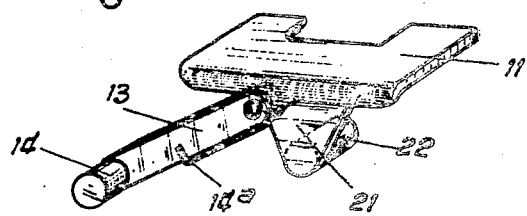
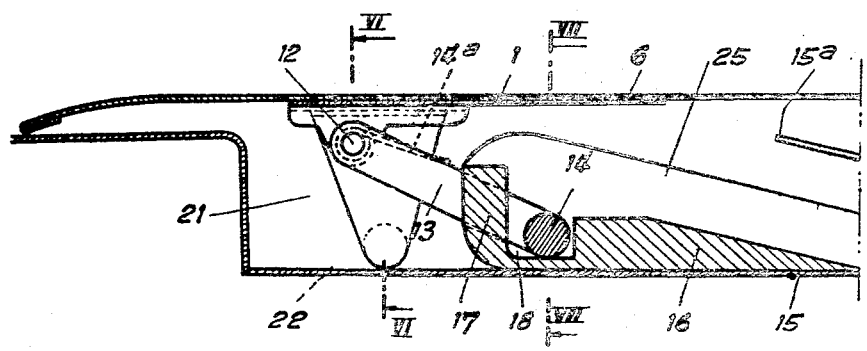
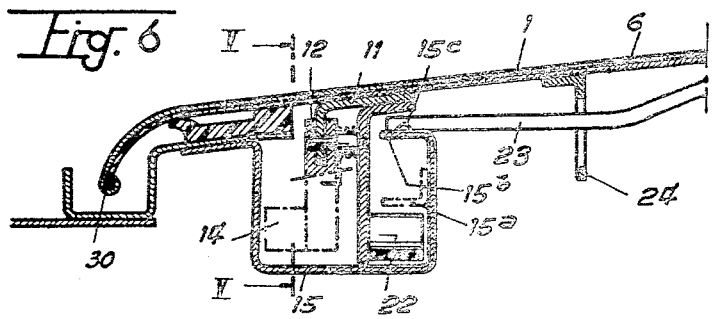
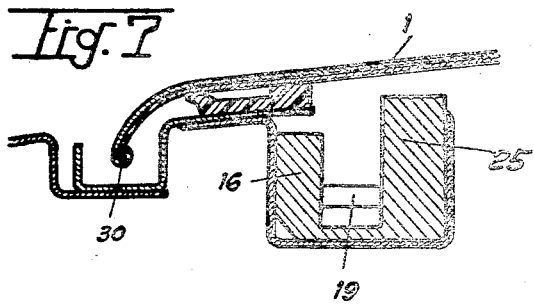

Aug. 27, 1968   J. G. CADIOU   3,398,486
ROOF ASSEMBLIES
Filed Dec. 22, 1966   6 Sheets-Sheet 4
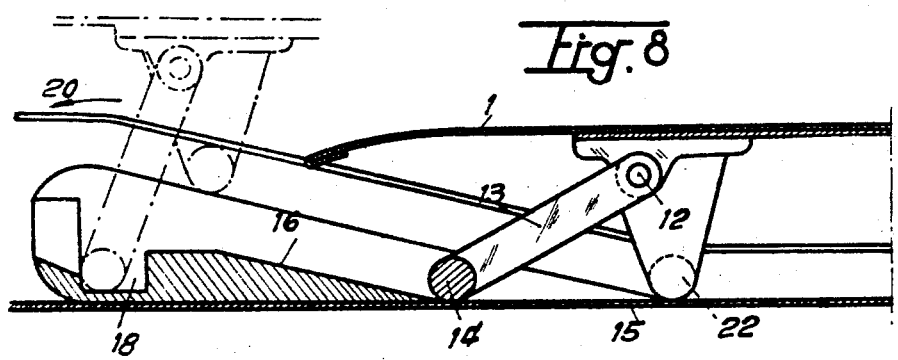
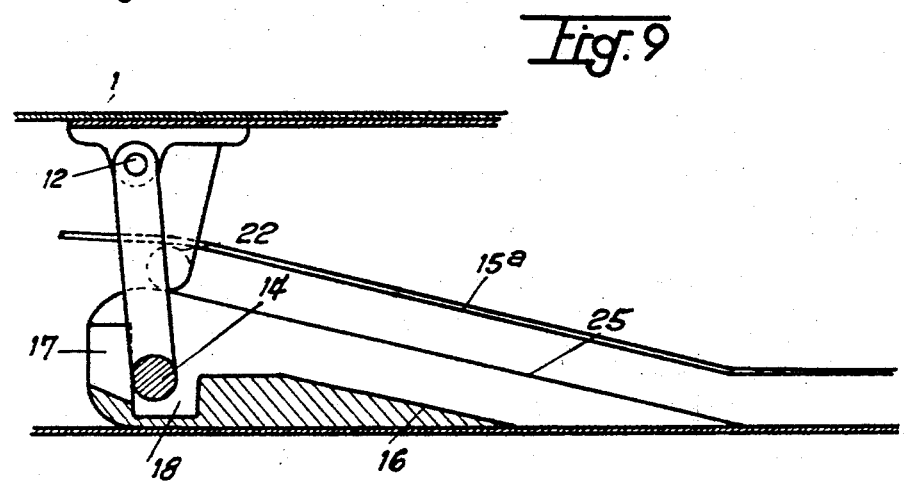
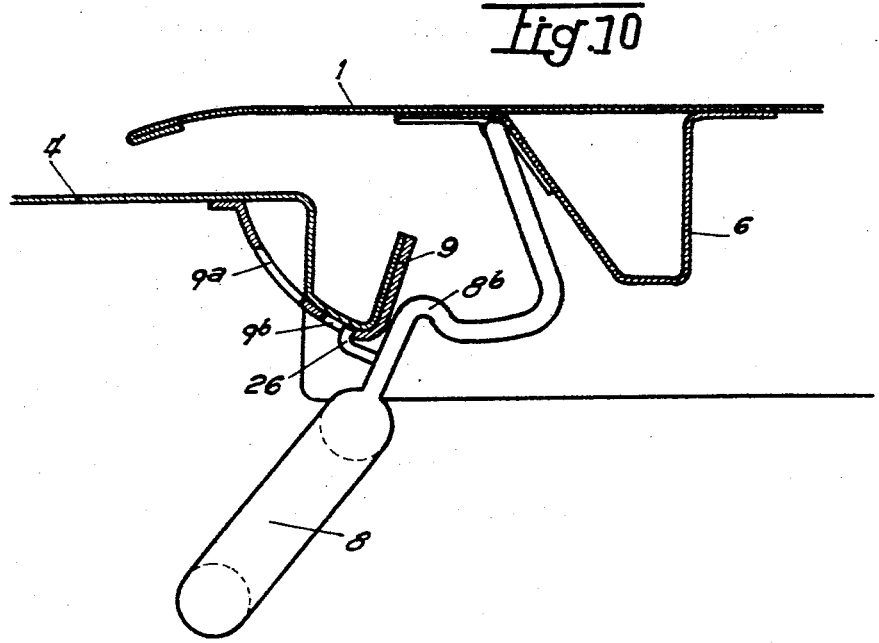

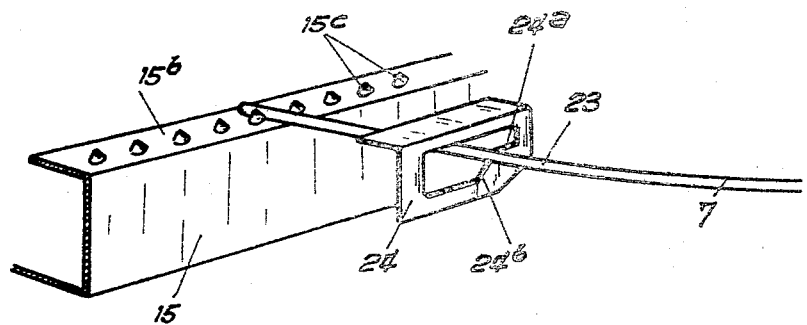
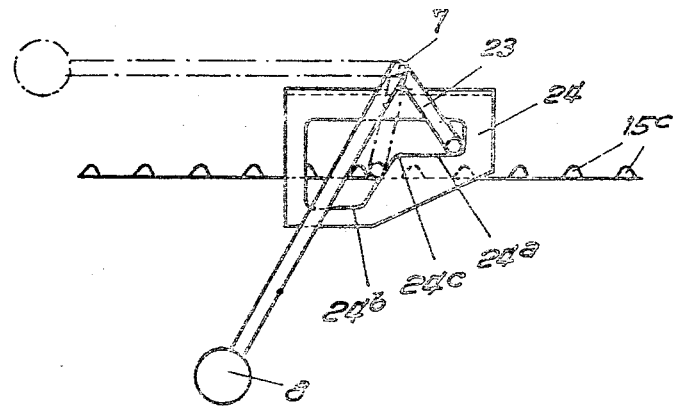

Aug. 27, 1968  J. G. CADIOU  3,398,486
ROOF ASSEMBLIES
Filed Dec. 22, 1966  6 Sheets-Sheet 6
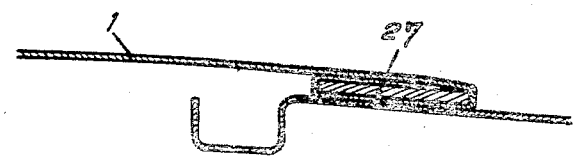
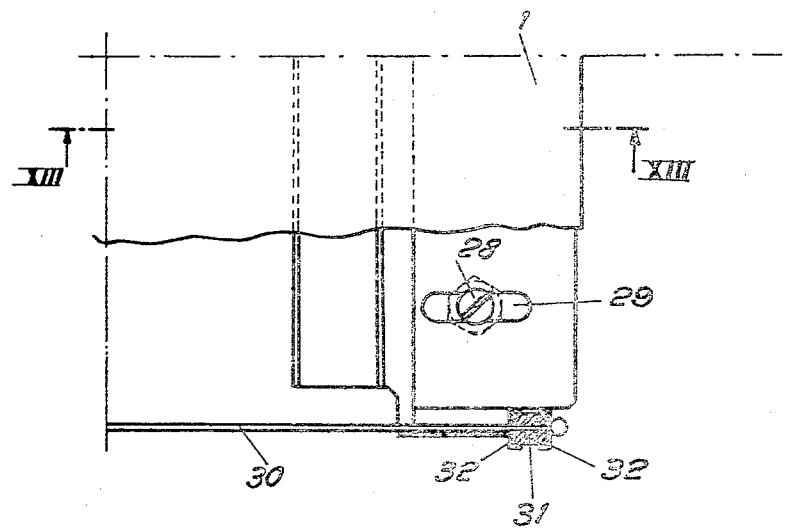

United States Patent Office 3,398,486
Patented Aug. 27, 1968

3,398,486
ROOF ASSEMBLIES
Jean G. Cadiou, Paris, France, assignor to Societe Anonyme Andre Citroen, Paris, France, a French company
Filed Dec. 22, 1966, Ser. No. 603,989
Claims priority, application France, Dec. 28, 1965, 3,250
12 Claims. (Cl. 49—209)

ABSTRACT OF THE DISCLOSURE

An automobile sun roof which may be raised to provide ventilation or slid to uncover an opening in the roof and allow sunlight to enter. The roof opening has on each of two of its opposite sides a hollow guide rail in each of which are two ramps of different heights and an abutment which is separated from the ramps by a cavity, the sun roof having, adjacent to each of the guide rails a downwardly extending guide member with a first roller which rides on the bottom of the associated guide rail, and a second roller which is mounted on the end of an arm pivoted to the guide member, so that, when the sun roof is moved, the first roller rolls over the bottom of that guide rail and onto the higher of the two ramps and the second of the rollers rides on the lower of the two ramps until it falls into the cavity and contacts the abutment thereby causing the arm to pivot and the sun roof to move forwardly and downwardly until the first roller is again at the bottom of the guide rail.

---

The present invention relates to roof assemblies and particularly, but not exclusively, to sun roofs for vehicles.

According to the present invention, there is provided a roof assembly having an opening therein, said opening being defined by first, second, third and fourth edges, including a flexible roof having first, second, third and fourth edges movable to bridge corresponding said first, second, third and fourth edges of said roof assembly defining said opening, said third and fourth edges being parallel to one another, guide means along said third and fourth edges of said roof assembly, handle means operable to move the first edge of said flexible roof over a range between an open and a closed position, a rod, having first and second ends, pivotally mounted at said first end with respect to each third and fourth edge of the flexible roof near to said first edge of said flexible roof, a guide member engageable with said guide means and rigid with said second end of each said rod, and an abutment in said guide means for limiting the movement of said guide members before complete closure of said flexible roof, whereupon on completion of closure said rod is caused to pivot about its pivotal axis.

An embodiment of a sun roof assembly in accordance with the invention will now be described, by way of example, with reference to the accompanying diagrammatic drawings, in which:

FIGURE 1 is a perspective view of the opening over which the roof is mounted;

FIGURE 2 is a longitudinal section of the roof and shows one of the control handles;

FIGURE 3 is a fragmentary view from beneath this handle;

FIGURE 4 is a perspective view of a guide member;

FIGURE 5 is a longitudinal section of the roof, along line V—V of FIGURE 6, the roof being in a closed position;

FIGURE 6 is a transverse section of one of the longitudinal edges of the roof;

FIGURE 7 is another transverse sectional view;

FIGURE 8 is a view similar to that in FIGURE 5, the roof approaching its closed position;

FIGURE 9 is another longitudinal section of the roof, at the time of pivoting of the rods;

FIGURE 10 shows how the roof can be secured in a partially open position;

FIGURE 11 is a perspective view showing a further device capable of being used for maintaining the roof in an intermediate position;

FIGURE 12 is a transverse section;

FIGURE 13 is a longitudinal section along XIV—XIV or FIGURE 14; and

FIGURE 14 is a plan view with a cutaway and partial section, of the rear end of one of the longitudinal edges of the roof.

In the drawings, the openable roof is constituted by a sheet 1 of flexible, impervious and slightly elastic material, which is fixed, from place to place, to arcuate members and is capable of opening or closing an opening 3 provided in the main fixed roof 4 of an automobile vehicle; in the example shown, this opening is rectangular and has a slightly convex upwards curvature both in a transverse direction and a longitudinal direction (FIGURE 1). The rear edge of the sheet 1 is secured to the main roof 4, and the ends of the arcuate members carry rollers guided along the length of the longitudinal edges of the opening 3.

The free front edge of the sheet 1 is supplied with a metallic cross rod 6 which is in the form of a box, save at its extremities where it is flat. This cross rod carries at least one control handle 8 which is pivoted at 7 on the cross rod and of which a portion 8a is curved and can be applied on a portion of the same shape on the forward edge of the opening 3, or on an auxiliary member 9 fixed to this edge, the roof being then in a closed position (FIGURES 2 and 3). Preferably, the portion 8a has its centre at 7 whilst the centre of the auxiliary member 9 is slightly eccentric and is positioned at 10; thus resilient locking is effected, to the main roof 4, by the handle 8, and thus the locking of the roof 1 in its closed position. The handle 8 may have a catch 8b which just engages in an aperture 9a of the member 9 for further locking.

Near to each of the ends of the cross bar 6, under the latter, a guide member 11 is fixed, in the form of an angle (FIGURE 4). On the outer limb of this member a small rod 13 is pivotaly mounted at 12 which carries at its free end a roller or a runner 14, of a material with a low coefficient of friction.

A hair-pin spring 14a, of which the ends are supported on the member 11 and on the rod 13 respectively, urges the rod 13 towards a position in which it is directed towards the forward edge of the roof (see FIGURE 8).

The roller or runner 14 extends outwardly and engages in a slotted hollow guidance rail 15 which is fixed at the longitudinal edge of the opening 3 or forms part of the main roof 4.

A ramp 16 is disposed in the interior of the rail 15 on which the runner or roller 14 slides when the free end of the roof approaches in proximity to the forward edge of the opening 3. This ramp is extended by an abutment 17 from which it is separated by a space 18; the abutment 17 includes an aperture 19 for the passage of the rod 13.

When the forward cross rod 6 is made to slide by means of the handles 8, the rollers or runners 14 which are at that time in front of the guide members 11 (FIGURE 8) and which are guided by the small pivoted rods 13, slide in the rails 15; they come into contact with the ramps 16 at the moment when this cross rod is near the point of closure of the roof. The runners then climb the ramps whilst slightly lifting the rods, then entering the cavities 18 and are stopped by the abutments 17. From this time, the continuation of the forward displacement of the rod 6 causes the rods 13 to pivot about the axes of the rollers 14, as indicated by the arrow 20 of FIGURE 8; the rollers then return to the bottom of the cavities 18; at the end of movement, the rods are substantially at the same inclination to that at the start, but directed in the inverse sense (FIGURE 5).

As seen in the drawings, when the roof is almost closed, the cross rod 6 takes a downward movement towards the framework of the aperture 3, whilst being displaced only very little forwardly. It is thus sufficient for the user to hold on to the handles 8, which are then effectively above him, in order to ensure complete closure of the roof which is tightened progressively and of which the cross rod 6 lies down flat on the framework surrounding the opening 3. At the same time, the user can push the handles which lock themselves on the members 9 (FIGURE 2). In this position, the handles are close to the interior surface of the main roof 4 and cannot be in the way or dangerous.

In order to prevent the cross rod 6 from being moved outwardly and in order to keep the rollers 14 within the rails 15, each guide member 11 is rigid with a bracket 21 which also carries a roller or runner 22 engaged below an inner flange 15a of the rail 15 (FIGURES 4 and 6). This flange rises in the neighbourhood of the front end of the rail, as shown in FIGURES 6 and 9, in order to prevent the cross rod 6 from disengagement subsequent to the pivoting movement of the rods 13.

When the rollers 14 leave the ramps 16, as shown in chain lines in FIGURE 8, the forward movement of the cross rod 6 is accompanied as has been shown, by an upward movement of this cross rod. In order to avoid any operational difficulty owing, for example, to that which the pull exerted on the handles 8 by the user is directed downwardly, it is advantageous to provide, furthermore, means for ensuring, in a positive manner, this upward movement of the cross rod.

To this end, in the embodiment shown, the runner 22 moves, when the cross rod 6 arrives in the proximity of the closure position, onto a ramp 25 disposed within the rail, at the side of the ramp 16. When the roller 14 rolls on the ramp 16, the roller 22 rolls simultaneously on the ramp 25, but the latter is longer, so that, when the roller 14 leaves the ramp 16 and becomes level with the cavity 18 (FIGURE 9), the runner 22 is still on the ramp 25. This ramp thus duplicates the ramp 16 but, moreover, maintains the elevation of the cross rod 6 during the pivoting of the rods 13.

The open or sunshine roof shown can be held ajar in order to provide limited ventilation of the vehicle, when the weather permits. For this reason, each of the handles 8 includes a hook 26 which can engage in an aperture 9b of the member 9 (FIGURE 10).

Alternately, hand control means may be provided enabling the cross rod 6 to be secured within rails 15; the user can then select the securing position of the cross rod which corresponds to the desired opening of the roof.

It is thus that, in the embodiment shown, one of the handles 8, or each of them, is extended externally by a rod 23 which acts as a spring and co-operates with a can 24 rigid with the cross rod 6 (FIGURE 11). The rod 23 lies in a plane which makes a relatively small angle with the plane of the handle, towards the end thereof. The cam 24 consists of a bracket of which one limb has an opening traversed by the rod; the lower edge of this opening comprises a plane, relatively high, rear portion 24a, which is extended forwardly by a descending ramp 24b, the meeting point 24c of the two portions lies substantially in a vertical plane passing through the axis of the pivot 7 of the handle.

When the handle 8 is in a hanging position, before the opening or any displacement of the hood, as shown in full lines in FIGURE 12, the rod 23 is placed on the rear edge 24a of the cam 24. When the cross rod 6 is in an intermediate open position and the user pushes the handle 8, the rod 23 slides on the edge 24a and engages itself on the ramp 24b, which permits the end of this rod to move towards the base and to contact the edge of 15b of the rail 15, as indicated by chain lines in FIGURE 12. The edge 15b has bosses 15c which secure the rod 23 laterally. The cross rod 6 is thus locked and the roof is held in its intermediate opening position. At the same time, the rod 23 urges upwards the handle 8 and tends to stretch the latter to lie flat against the roof; the handle is thereby secured and does not vibrate.

Thus, as will be apparent from the preceding description, the functioning of the roof requires that the sheet 1 should have a degree of elasticity and should be positively held in the closure position.

In order to produce an appropriate tension, the rear end of the sheet 1 is fixed to a cross rod 27 which is fixed in an adjustable manner to the frame surrounding the opening 3, for example by screws or bolts 28 engaged in slots 29 in the main roof 4 (FIGURES 13 and 14).

On the other hand, the sheet 1 may not possess sufficient elasticity to operate correctly. In order to produce this elasticity, each longitudinal edge of the sheet 1 may be provided with a metallic cable 30 of which one of its ends is fixed, for example, to the edge forwardly of the sheet, whilst its other end is connected in an elastic manner to its rear edge.

In the example shown, a block of india rubber 31 is inserted between the two plates 32, the assembly being disposed between the ends of the cable and of the cross rod 27.

I claim:
1. In a roof assembly having an opening therein, said opening being defined by first, second, third and fourth edges,
   a flexible roof having first, second, third and fourth edges movable to bridge said first, second, third and fourth edges respectively of said roof assembly defining said openings, said third and fourth edges being parallel to one another,
   guide means along said third and fourth edges of said roof assembly, and
   handle means operable to move the first edge of said flexible roof over a range between an open and a closed position,
   the improvement comprising, a rod, having first and second ends, pivotally mounted at said first end with respect to each third and fourth edge of the flexible roof near to said first edge of said flexible roof,
   a guide member engageable with said guide means and rigid with said second end of each said rod, and
   an abutment in said guide means for limiting the movement of said guide members before complete closure of said flexible roof, whereupon on completion of closure said rod is caused to pivot about its pivotal axis.
2. An assembly according to claim 1 wherein said guide means includes means defining a ramp adjacent each said abutment.
3. An assembly according to claim 2 wherein each pair of facing surfaces of said abutment and ramp define an opening for receiving at least part of one said guide member.
4. An assembly according to claim 3 including raising means provided on said third and fourth edge of said flexible roof, whereby to raise the first edge of said flexible roof with respect to the other said first edge, just before complete closure, to enable the rod to pivot on complete closure.
5. An assembly according to claim 4 wherein said raising means comprises a second ramp disposed in said guide means and a roller engaged in said guide means and engageable with said second ramp.

6. An assembly according to claim 1 wherein said handle means is pivotally mounted with respect to said first edge of the flexible roof and includes a curved portion which on closure of the flexible roof is engageable for locking, with a corresponding curved portion of the first edge of the roof assembly, the centers of curvature of said portions being spaced from one another.

7. An assembly according to claim 6 wherein said handle means includes a catch engageable with said first edge of said roof assembly.

8. An assembly according to claim 1 wherein said guide member comprises, a roller and said guide means comprise, a slot and a flange member defining the path of each said roller along said third and fourth edges of said roof assembly respectively.

9. An assembly according to claim 1 wherein the handle means includes a hook engageable with said first edge of said roof assembly whereby to maintain said flexible roof in a partially open position.

10. An assembly according to claim 1 wherein means are provided for securing the corresponding second edges in a relatively adjustable manner.

11. An assembly according to claim 1 including a wire resiliently connected between the ends of each third and fourth edge of said flexible roof.

12. An assembly according to claim 1 including a cam member rigid with said flexible roof, a plurality of bosses distributed along said third and fourth edges of said roof assembly and a rod rigid with said handle means engaging with said cam member and engageable with any pair of corresponding bosses on rotation of said handle whereby to lock said flexible roof in a fractionally, open position.

References Cited

UNITED STATES PATENTS

| | | | |
|---|---|---|---|
| 2,025,874 | 12/1935 | Lange | 296—137 |
| 2,193,608 | 3/1940 | Votypka | 49—210 X |
| 2,263,216 | 11/1941 | Latchford | 296—137 |
| 2,550,323 | 4/1951 | Bishop | 49—209X |
| 3,261,133 | 7/1966 | Herr et al. | 49—209X |

DAVID J. WILLIAMOWSKY, *Primary Examiner.*

DENNIS L. TAYLOR, *Assistant Examiner.*